United States Patent [19]

Zielinski

[11] Patent Number: 4,939,980
[45] Date of Patent: Jul. 10, 1990

[54] TANK TURRET MAGAZINE SYSTEM WITH A PRIMARY MAGAZINE AND AN ADDITIONAL MAGAZINE

[75] Inventor: Erich Zielinski, Dusseldorf, Fed. Rep. of Germany

[73] Assignee: Rheinmetall GmbH, Düsseldorf, Fed. Rep. of Germany

[21] Appl. No.: 384,687

[22] Filed: Jul. 25, 1989

[30] Foreign Application Priority Data

Jul. 26, 1988 [DE] Fed. Rep. of Germany ....... 3825292

[51] Int. Cl.⁵ ............................................. F41A 9/34
[52] U.S. Cl. ....................................... 89/46; 89/33.14
[58] Field of Search ............... 89/45, 46, 33.14, 33.16, 89/33.2, 33.25

[56] References Cited

U.S. PATENT DOCUMENTS

| | | | |
|---|---|---|---|
| 2,382,522 | 12/1945 | Trotter | 89/33.5 |
| 2,984,157 | 5/1961 | Johnstone | 89/1.802 |
| 2,997,923 | 8/1961 | Kempton | 89/1.804 |
| 3,026,662 | 5/1962 | Largen et al. | 89/46 |
| 3,166,975 | 1/1965 | Landstrom et al. | 89/1.802 |
| 3,724,324 | 2/1973 | Zielinski | 89/45 |
| 4,064,787 | 12/1977 | Eklund et al. | 89/34 |
| 4,388,854 | 6/1983 | Dabrowski et al. | 89/46 |

FOREIGN PATENT DOCUMENTS

| | | | |
|---|---|---|---|
| 148423 | 7/1985 | European Pat. Off. | 89/46 |
| 2235727 | 1/1974 | Fed. Rep. of Germany | 89/46 |
| 3132631 | 3/1983 | Fed. Rep. of Germany | 89/46 |
| 2502767 | 8/1982 | France | 89/45 |
| 2588371 | 2/1986 | France | 89/45 |
| 8606826 | 9/1986 | Int'l Pat. Institute | 89/46 |
| 27643 | of 1909 | United Kingdom | 89/46 |

Primary Examiner—Charles T. Jordan
Assistant Examiner—Stephen Johnson
Attorney, Agent, or Firm—Spencer & Frank

[57] ABSTRACT

A tank turret magazine system includes a circulating primary magazine, an additional magazine, and a transfer mechanism for moving ammunition containers between the magazines. The additional magazine provides increased storage capacity without increasing the length or width of the turret and without sacrificing automatic operation of the primary magazine. The additional magazine and the transfer mechanism are preferably disposed below the primary magazine. For a direct exchange of ammunition containers from the one magazine to the other magazine, the transfer mechanism includes two transfer levers which are pivotal about an axis and which are able to grip pivot pins mounted on both sides of the ammunition containers. The additional magazine may be configured as a single-row static magazine. In this embodiment, the transporting levers are arranged so as to be displaceable, by way of a carriage, in the longitudinal direction of the magazine system for exchange of any desired container from the lowermost row of the primary magazine. If the additional magazine is configured as a double-row circulating magazine, the axis of the transporting levers need not be moved longitudinally and the carriage may be omitted.

11 Claims, 8 Drawing Sheets

TANK TURRET MAGAZINE SYSTEM WITH A PRIMARY MAGAZINE AND AN ADDITIONAL MAGAZINE

BACKGROUND OF THE INVENTION

The present invention relates to a tank turret magazine system. More particularly, the invention relates to a system which incorporates a primary tank turret magazine of the type which includes tubular ammunition carriers for receiving and supplying ammunition, the containers being disposed behind a gun and being arranged parallel to one another and to the bore axis of the gun barrel. In order to circulate the containers along an endless path in superposed horizontal planes transversely to the bore axis, the ends of the containers are connected via pivot pins with transporting chains moving in guides.

Such primary magazines, as they are disclosed in U.S. Pat. No. 3,724,324, circulate in two layers in the manner of a bucket conveyor. Because of their flat structures, such magazines are preferred for use in the confined space of a tank turret.

German Offenlegungsschrift (un-examined, published patent application) 3,132,631 discloses a further circulating magazine in which, however, shells are loaded and removed only at a single discharge location in the lowermost row of the magazine, which is composed of at least three layers. The conveying mechanism required for this magazine makes it necessary for two parallel arranged chain drives and their driving means to be arranged in a space-consuming manner on both sides of the magazine so as to grip and transport the shells.

SUMMARY OF THE INVENTION

It is an object of the present invention to modify a primary tank turret magazine of the type described in the initial paragraph of the foregoing section so that changes in width and length of the primary magazine are avoided, and so that empty ammunition containers are automatically exchanged directly for full ones between an expanded portion of the magazine system and a primary tank turret magazine.

This object can be attained by providing a tank turret magazine system which is characterized in that, in order to exchange ammunition containers, an additional magazine and a transfer mechanism are provided below or above the primary tank turret magazine and, in order to transfer ammunition containers from one magazine to another, the transfer mechanism is pivotal about an axis and includes transportation levers which are able to grip the pivot pins.

A magazine system which, in accordance with the invention, includes a known primary magazine which circulates ammunition containers in the tank turret in the manner of a bucket conveyor, an additional magazine above or below the primary magazine, and a transfer mechanism which pivots about an axis, permits an empty ammunition container from the circulating primary magazine to be transferred into the additional magazine and, when the transfer mechanism pivots back, permits a full ammunition container from the additional magazine to be transferred into the primary magazine. The reverse direction of transporting also being possible. The system according to the invention thus ensures an automatic ammunition supply and, because of the expansion of the magazine, provides a significant increase in ammunition storage capacity. By arranging the additional magazine below or above the known circulating primary magazine, existing free vertical space in the turret can be utilized without requiring any change in the length and width of the primary magazine and thus of the turret.

The transfer mechanism is essentially composed of two transporting levers connected with one another by way of a yoke disposed between the magazines. In one embodiment of the invention, these levers are displaceable in the longitudinal direction of the magazine by means of a carriage and, in another embodiment, they are stationary. The displaceability of the transfer mechanism by means of the carriage permits the advantageous arrangement of a simple single-row, static, additional magazine in which the ammunition containers are not displaced in a transverse direction. This magazine can be adapted to special conditions. For example, by omitting a container, space is made available in a simple manner for the placement of an insertion mechanism. In this embodiment it is not all of the ammunition containers, including the containers stored in the additional magazine, which are caused to circulate, but only the containers of the primary magazine. Consequently the drive assemblies for the circulation need not be enlarged. The inertial masses to be moved, particularly for transfer of the ammunition, are small, so that the loading process can take place comparatively quickly.

According to another embodiment, a stationarily mounted transfer mechanism is associated with a two-layer circulating additional magazine. In this embodiment, the ammunition containers of the additional magazine are moved automatically by the circulation so that the carriage supporting the transporting levers is not required.

In both embodiments, the ammunition containers are transferred, in a particularly advantageous manner, directly into o out of a safety catch disposed at a chain link plate of the circulating magazine. A fork disposed at each transporting lever engages pivot pins, which are mounted at each end of an ammunition carrier, during a transfer.

DESCRIPTION OF THE PREFERRED EMBODIMENTS

Figure 1:
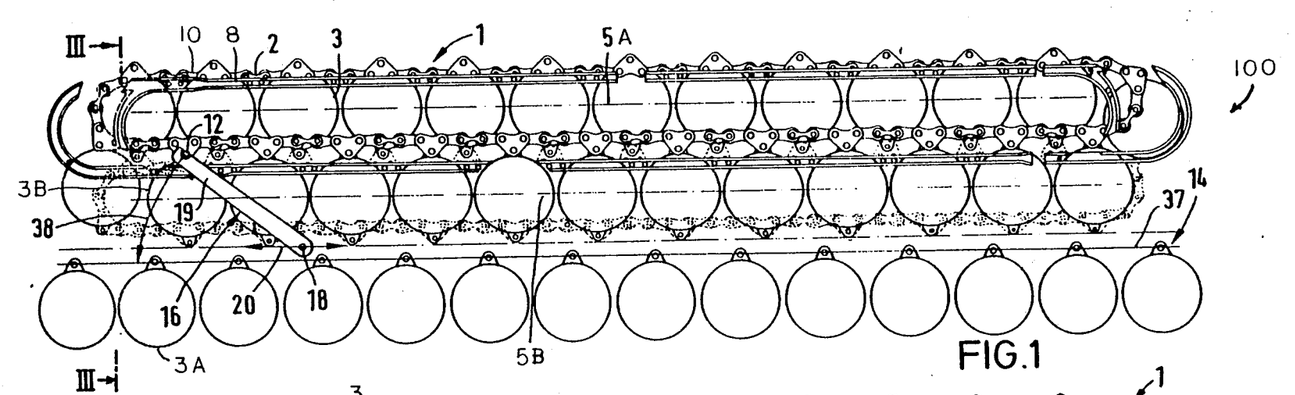
FIG. 1 is a side view of a first embodiment of a magazine system in accordance with the present invention, and illustrates a two-layer circulating primary magazine, a static additional magazine, and a transfer mechanism.

FIG. 1 illustrates a tank turret magazine system 100, which includes an essentially prior art tank turret magazine, hereinafter also called the primary magazine 1. An additional magazine 14 is disposed below the primary magazine 1 and a transfer mechanism 16 is provided for exchange of ammunition containers 3 disposed in magazines 1 and 14. Transfer mechanism 16 is equipped with transporting levers 19 which pivot it about a shaft 18.

Figure 3:
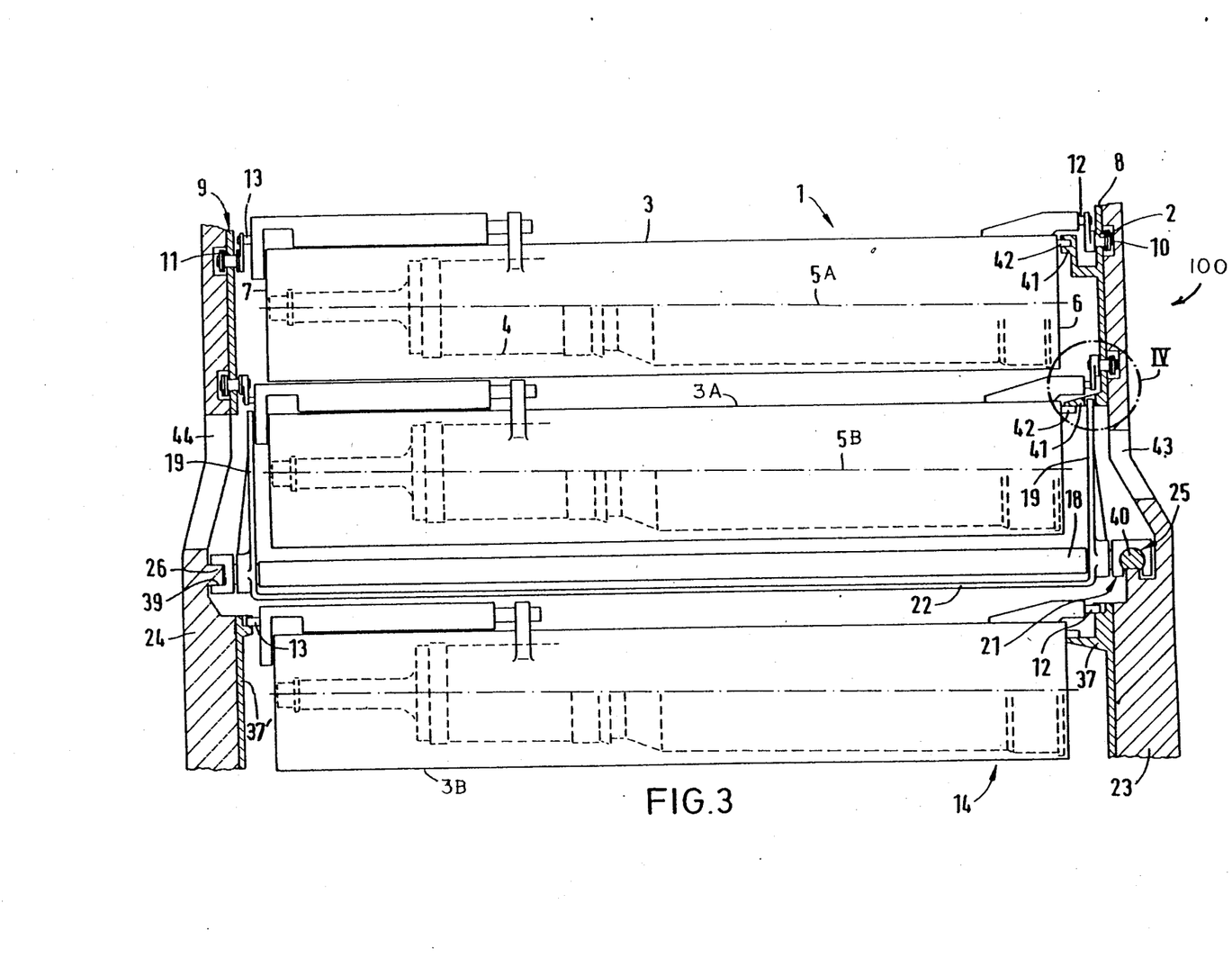
FIG. 3 is a cross-sectional view along a line marked III—III in FIG. 1.

Primary magazine 1 is disposed behind a large-caliber gun barrel (not shown) in a tank turret (not shown). Primary magazine 1 carries ammunition containers 3, which circulate along an endless path 2 and are arranged parallel to one another and to the bore axis of the gun barrel. In order to receive and supply ammunition 4 (FIG. 3), ammunition containers 3 have a tubular shape and lie above one another in horizontal planes 5A and 5B so as to circulate transversely with respect to the gun barrel. Such an arrangement is disclosed in U.S. Pat. No. 3,724,324, which is incorporated herein by reference. As is shown in FIG. 3, the ends 6 and 7 of ammunition containers 3 are connected, via oppositely disposed pivot pins 12 and 13, with transporting chains 10 and 11. Chains 10 and 11 are guided along path 2 by chain guides 8 and 9. The containers 3 which are suspended from the top span of the chains lo and 11 move in horizontal plane 5A, while the containers which are suspended from the bottom span of the chains 10 and 11 move in horizontal plane 5B.

The additional magazine 14 shown in FIG. 1 is a one-layer, static magazine in which containers 3 are supported on a rail 37 (not shown in detail in FIG. 3) or are stored in individually suspended mounts (not shown). In magazine 14, one storage location for an ammunition container 3 must be available as an empty location to receive the first empty ammunition container 3 from the primary magazine 1. The empty location is not shown in FIG. 1, and for the sake of convenient illustration a container 3A is depicted where the empty location would be in order to receive container 3B from primary magazine 1.

Under special circumstances, at least one empty position in magazine 14 would also provide an opportunity to accommodate an insertion mechanism (not shown) for advancing the ammunition 4 toward the gun barrel.

Transfer mechanism 16 must be moved, for removal of any desired ammunition container 3, by a carriage 21 (FIG. 3) and a displacement drive (not shown). The transfer mechanism 16 is moved along the static additional magazine 14 in the longitudinal direction 20 of the magazine, that is, transverse to the positions of ammunition 4.

FIG. 3 shows the arrangement of a transfer mechanism 16 and a carriage 21 which is displaceable in the longitudinal direction 20 (FIG. 1) of the magazine system 100-- that is, parallel to magazines 1 and 14. The transfer mechanism 16 is disposed between the primary magazine 1 and the additional magazine 14, and includes a pair of levers 19 which form a rigid unit by way of a yoke 22. The yoke 22 is mounted so as to pivot about shaft 18, which is carried by carriage 21. On the one side of the magazine system 100, carriage 21 is guided by a circular guide 25, and on the other side carriage 21 is guided by a supporting rail 26. Circular guide 25 is mounted on magazine wall 23 and supporting rail 26 extends from magazine wall 24.

Circular guide 25 has an essentially circular cross section 40 but is flattened in its lower region in order to fasten it (not shown) to magazine wall 23. The circular portion of the guide is enclosed by the associated half of the carriage 21, thus ensuring guidance of carriage 21 in the elevational and lateral direction. The other half of carriage 21 includes a lateral guide groove 39 which, in order to fix the device in height, grips around the rectangular supporting rail 26 which extends from the other magazine wall 24.

According to FIGS. 4 to 8, in order to accommodate the pivot pins 12 and 13 (FIG. 3) disposed at each container 3, each one of the two transporting levers 19 is equipped with a respective fork 27 (FIGS. 5 to 8). Furthermore, each chain link 28 (FIG. 4) of transporting chains 10 and 11 associated with a pivot pin 12 or 13 is equipped with a chain link plate 29 and a safety latch 30 (likewise shown in greater detail in FIGS. 5 to 8).

To accommodate a pivot pin 12 or 13, each safety latch 30 is mounted so as to be pivotal about a chain link shaft 32 against the force of a torsion spring 31, and includes a safety tab 33 which is able to enclose the pivot pin 12 or 13 on the side facing away from chain link plate 29. In contrast thereto, chain link plate 29 and fork 27 are each equipped with mutually facing receiving openings 34 and 35 which extend in the pivoting direction 38 of fork 27.

To insert pivot pin 12 or 13 into and remove it from the opening 35 of safety tab 33, transporting lever 19 includes a longitudinally abutment 36. This makes it possible to pivot away the safety tab 33 of safety latch 30 and to keep it open until pivot pins 12 and 13 of ammunition containers 3 slide out of the securing position of latch 30 and the holding position of chain link plate 29, as a result of the gravity of the ammunition containers 3, and into the receiving opening 34 of fork 27. The slope of transporting lever 19 is selected so that reliable ammunition transfer is ensured even if the turret is in its extreme oblique position.

Figure 4:
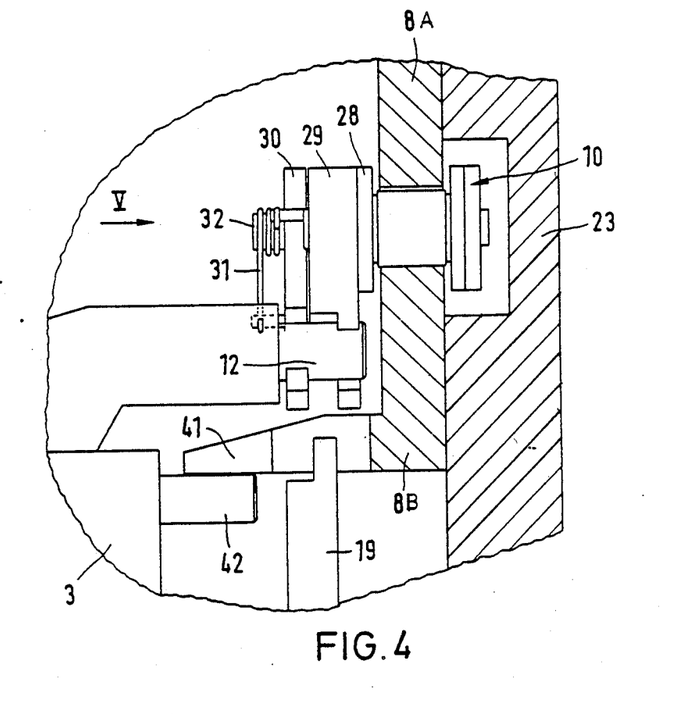
FIG. 4 is a view of a detail marked IV in FIG. 3.
Figure 5:
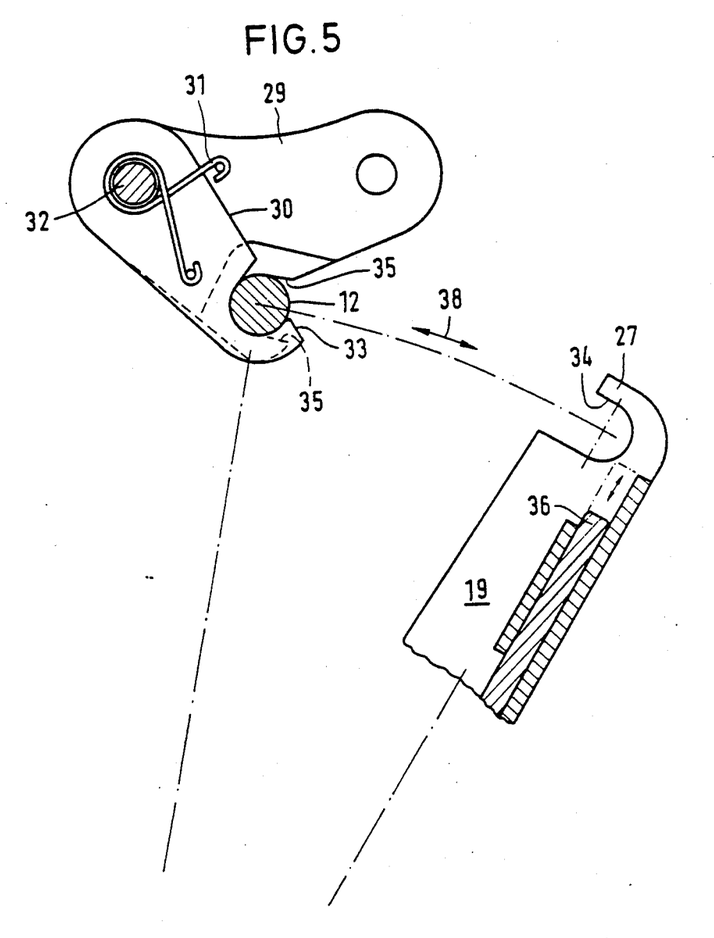
FIGS. 5 to 8 are views depicting various steps for insertion and discharge of ammunition containers by means of the transfer mechanism from a direction marked V in FIG. 4.

FIG. 5 shows the pivot pin 12 of an ammunition container 3 according to FIG. 4, with the container being held in the receiving opening 35 of chain link plate 29 and secured by the safety tab 33 of safety latch 30. The tab 33 of safety latch 30 is biassed by torsion spring 31 and acts as a safety bolt to prevent pivot pin 12 from sliding out.

Figure 6:
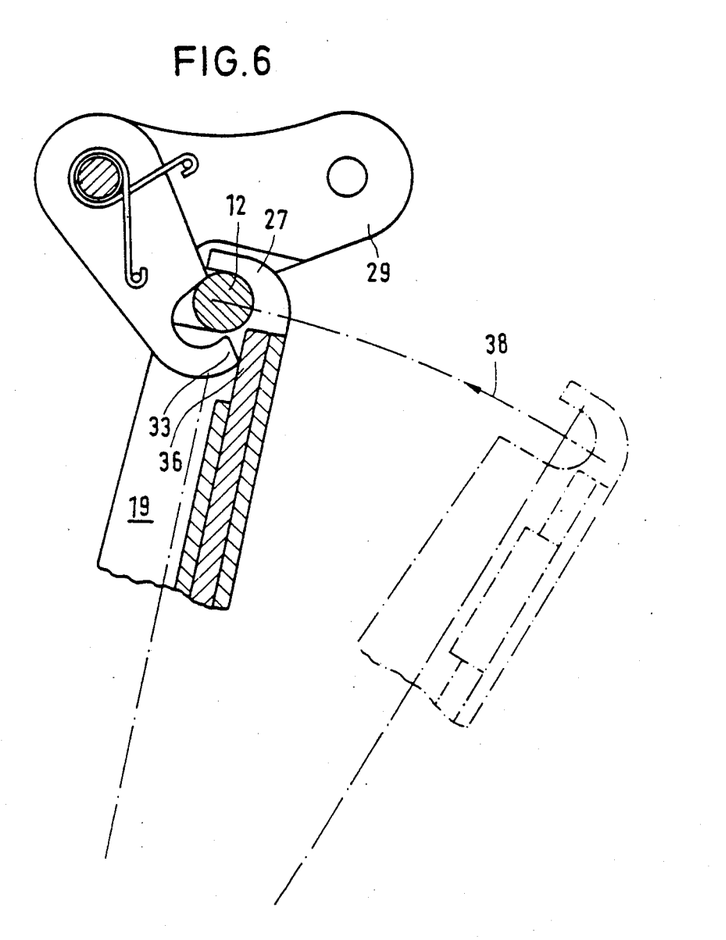

FIG. 6 shows the removal of pivot pin 12 from chain link plate 29 and from safety latch 30 by means of the fork 27 of transporting lever 19. To accomplish this, transporting lever 19 is driven by a motor or cylinder drive (not shown) in pivoting direction 38 about shaft 18 (FIG. 3). Before transporting lever 19 pivots toward chain link plate 29, the longitudinally displaceable abutment 36 is moved behind the receiving opening 34 of fork 27. When fork 27 approaches receiving opening 35 of chain link plate 29, abutment 36 pushes safety tab 33 into the illustrated opening position and guides pivot pin 12 into fork 27. Although not shown, the means for moving abutment 36 behind receiving opening 34 may be a cam which forces abutment 36 upward as transporting lever 19 advances toward chain link plate 29, with a spring returning abutment 36 to its retracted position when the transporting lever 19 subsequently rotates away from chain link plate 29. The cam can be moved out of position with a solenoid if elevation of abutment 36 as transporting lever 19 rotates is not desired, as will be mentioned later with reference to FIG. 8.

Figure 7:
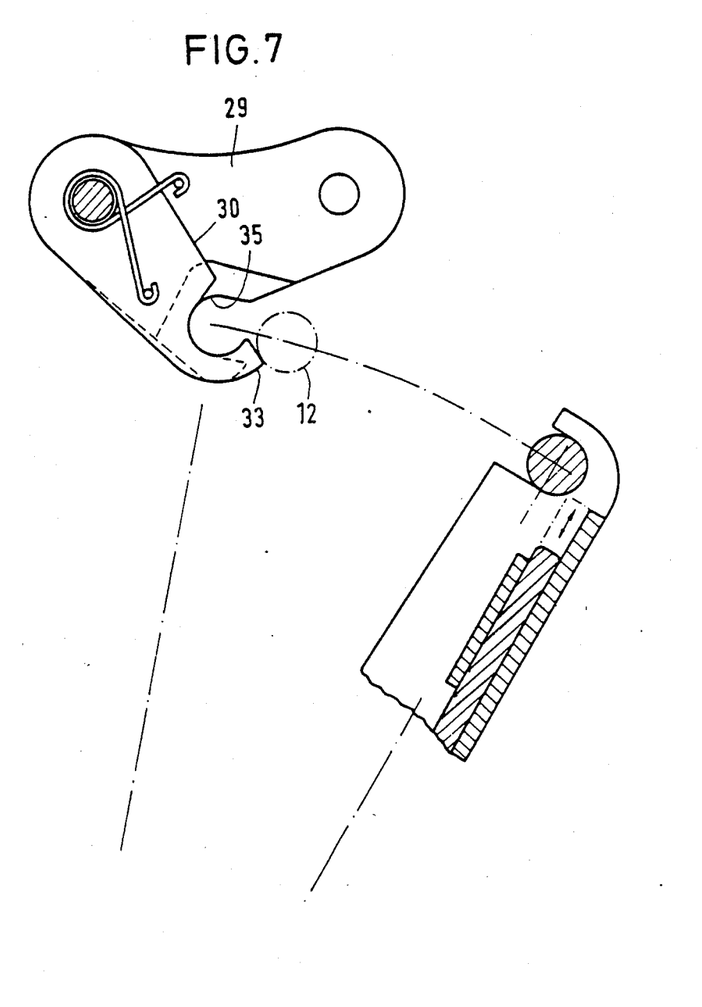

FIG. 7 shows transporting lever 19 of ammunition container 3 on its way towards chain link plate 29 of transporting chain 10. In this mode of operation, safety tab 33 of safety catch 30 is opened by the incoming pivot pin 12. The position of pivot pin 12 shown in dot-dash lines indicates at which point pivot pin 12 moves safety tab 33 from outside into the opening position.

Figure 8:
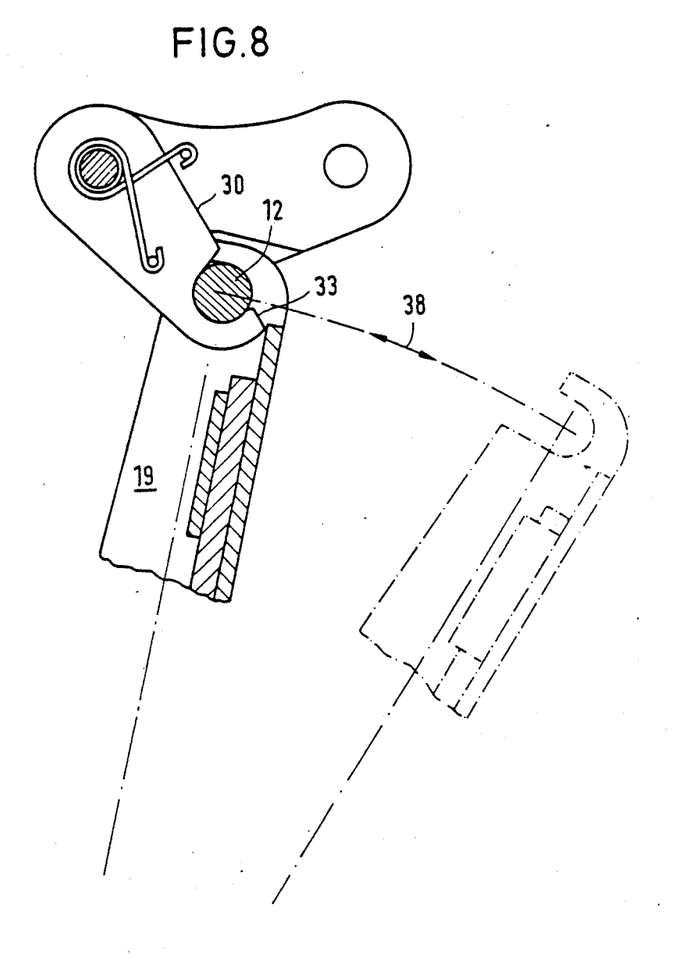

Finally, FIG. 8 shows that, by keeping abutment 36 of transporting lever 19 is in the retracted position, it is possible for safety tab 33 of safety latch 30 to automatically enclose and retain pivot pin 12.

According to FIGS. 3 and 4, the guide 8 includes two guide rails 8A and 8B which are fastened to magazine wall 23, and chain link plate 29 and safety latch 30 are fastened to a chain link 28 for transporting chain 10 which moves between the two guide rails 8A and 8B. The lower guide rail 8B is provided with an angled guide 41 so that a position guide pin 42 disposed on each side of the ammunition container 3 protects the ammunition container 3 against rotation about pivot pin 12. Although not illustrated, the guide 9 includes upper and lower guide rails corresponding to guide rails 8A and 8B.

As is shown in FIG. 3, the additional magazine 14 includes a depositing rail 37 mounted on magazine wall 23 and a depositing rail 37' mounted on magazine wall 24. This makes it possible in a space saving manner to quickly and directly exchange ammunition containers 3 between any desired position in the lower plane 5B of primary magazine 1 and an empty position in additional magazine 14. The placement of a container 3 on depositing rails 37 and 37' after the container 3 has been removed from primary magazine 1, and the picking-up of a container 3 for transfer to magazine 1, will be described with reference to FIGS. 1 and 3.

First, assume that a container 3 has been removed from magazine 1 in the manner discussed above with respect to FIG. 6. Carriage 21 is then positioned so that, when the transporting levers 19 of the transfer mechanism 16 are lowered to additional magazine 14, the pins 12 and 13 will move into notches in depositing rails 37 and 37' of additional magazine 14. After the pins 12 and 13 settle into the notches, transporting levers 19 are lowered still further to remove the pins 13 and 14 from the forks 27 (FIG. 5) of the transporting levers 19. Carriage 21 is thereafter shifted to move transfer mechanism 16 in longitudinal direction 20, away from the just-deposited container 3. The transporting levers 19 can then be raised away from the just-deposited container 3.

The sequence of steps is reversed when a container 3 is to be lifted from additional magazine 14. Briefly, transfer mechanism 16 is moved to a position which permits the levers 19 to be lowered below the pins 12 and 13 of the desired ammunition container 3. Transfer mechanism 16 is then shifted toward the desired container 3 until the receiving openings 34 (FIG. 5) are positioned to receive the respective pins 12 and 13, whereupon the transporting levers 19 are raised.

The magazine walls 23 and 24 shown in FIG. 4 also include openings 43 and 44 for the loading process, particularly for a rammer (not shown) and for the insertion of the ammunition into the gun barrel (not shown).

Figure 2:
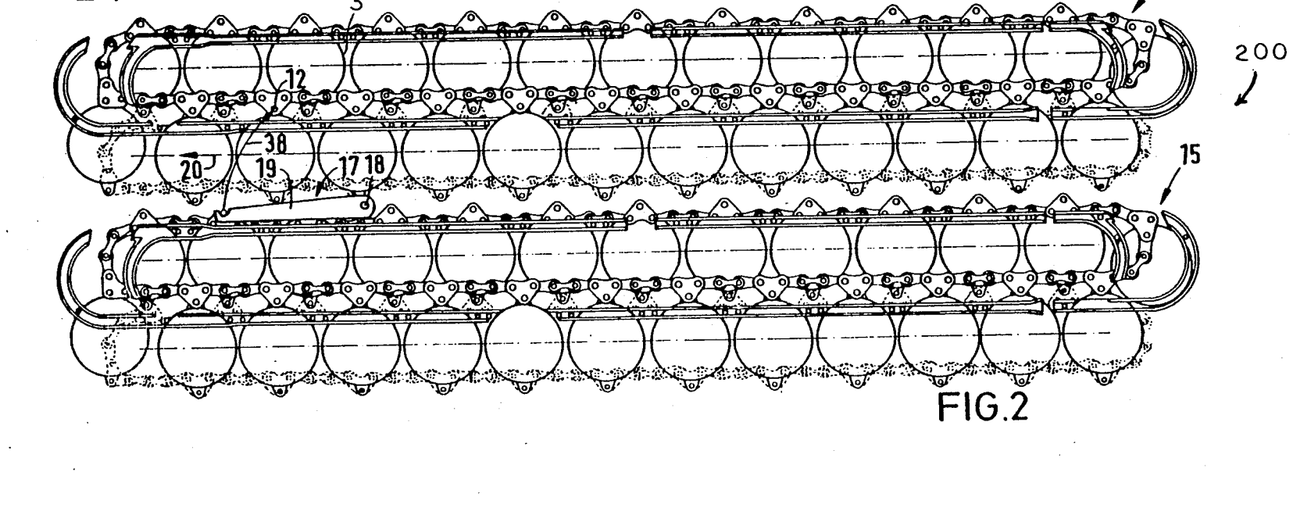
FIG. 2 is a side view of a second embodiment, in which the additional magazine is also a two-layer circulating magazine.

FIG. 2 illustrates a tank turret magazine system 200, which will be described only briefly in view of its similarity with system 100. System 200 includes a primary magazine 1, an additional magazine 15, and a transfer mechanism 17 having transporting levers 19 for exchange of ammunition containers 3.

Instead of a one-layer static magazine as in system 100, in the embodiment of FIG. 2 the additional magazine 15 is an endless, double-row circulating magazine corresponding to primary magazine 1. The use of a circulating magazine as the additional magazine 15 permits carriage 21 (FIG. 3) to be omitted, since the containers 3 carried by additional magazine 15 are moved longitudinally. Accordingly, the transporting levers 19 of transfer mechanism 17 can be connected via shaft 18 (FIG. 3) directly to magazine walls 23 and 24 (FIG. 3), without carriage 21 (FIG. 3).

In tank turret magazine system 200, the containers 3 are exchanged between primary magazine 1 and the transfer levers 19 in the manner discussed above with reference to FIGS. 5-8. However the exchange between transfer levers 19 and the additional magazine is somewhat different from the exchange described above for the first embodiment since the pivot pins 12 and 13 of the containers 3 are latched to the chains of additional magazine 15 in system 200. The container exchange with additional magazine 15 will be described below with reference to FIG. 9.

Figure 9:
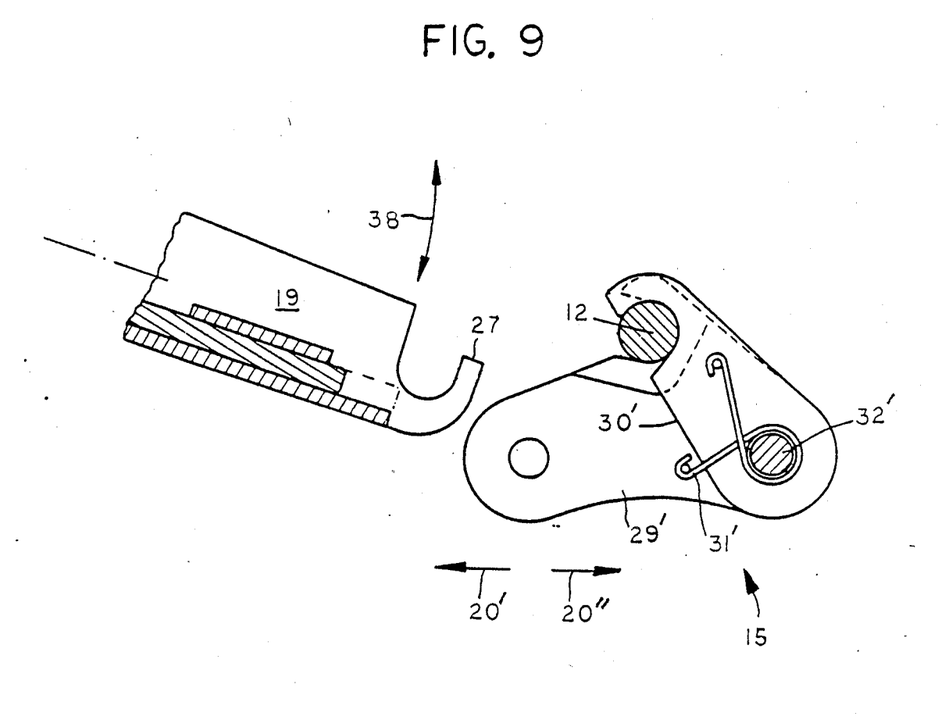
FIG. 9 is a view depicting the exchange of an ammunition container between the transfer mechanism and the additional magazine of the second embodiment, the view being taken in the same direction as in FIGS. 5–8.

FIG. 9 shows a chain link plate 29', a safety latch 30', a spring 31', and a chain link shaft 32' of one of the chains in the upper span of additional magazine 15. A pivot pin 12 extending from a container 3 (not shown in FIG. 9) is retained by safety latch 30'. FIG. 9 also shows a transfer lever 19 lowered to a receiving position to accept the container 3 from the additional magazine 15. To execute the exchange, additional magazine 15 is actuated to move chain link plate 29' and safety latch 30' longitudinally in direction 20'. As this movement occurs safety latch 30' contacts fork 27 and is pivoted about shaft 32', thus releasing pivot pin 12 for transfer to transporting lever 19. To ensure reliable reception of pivot pin 12 by transporting lever 19, transporting lever 19 is pivoted slightly upward in direction 38.

After pivot pin 12 has been received by transfer lever 19, additional magazine 15 is moved longitudinally in direction 20' to withdraw it from the effective range of fork 27. Transporting lever 19 then lifts the received container 3 to primary magazine 1.

The transfer of a container 3 from primary magazine 1 to additional magazine 15 is conducted in a similar manner but in a reversed sequence.

The above described arrangements of additional magazines 14 and 15 and the arrangement of transfer mechanism 16 can also be provided, in an analogous manner (not shown), above the primary magazine 1.

It will be understood that the above description of the present invention is susceptible to various modifications, changes, and adaptations, and the same are intended to be comprehended within the meaning and range of equivalents of the appended claims.

What I claim is:

1. A tank turret magazine system, comprising:
a primary magazine disposed at a first predetermined height, the primary magazine including elongated ammunition containers having ends and having pivot pins mounted adjacent the ends, the ammunition containers additionally having longitudinal axes, and means for circulating the ammunition containers along an endless path in superposed horizontal planes, the means for circulating including transporting chains, guide means for the transporting chains, and means for releasably connecting the pivot pins of the ammunition containers to the transporting chains so that the longitudinal axes of the ammunition containers are parallel to one another;

an additional magazine which is disposed at a second predetermined height, the second predetermined height being different from the first predetermined height; and transfer mechanism means for transferring ammunition containers between the magazines, the transfer mechanism means including a pair of transporting levers having means for gripping the pivot pins of the ammunition containers, and means for pivotably mounting the transporting levers, wherein the means for gripping the pivot pins comprises forks carried by the transporting levers, and wherein the means for releasably connecting the pivot pins to the transporting chains comprises chain link plates carried by the transporting chains and safety latches cooperating with the chain link plates.

2. The magazine system of claim 1, wherein the second predetermined height is less than the first predetermined height, the additional magazine being disposed below the primary magazine.

3. The magazine system of claim 1, wherein the transporting chains have chain link shafts, wherein the means for releasably connecting the pivot pins to the transporting chains further comprises a plurality of torsion springs, and wherein each chain link plate is mounted so as to be pivotal about a respective chain link shaft and is biassed by a respective torsion spring of the plurality of torsion springs.

4. The magazine system of claim 3, wherein each said fork has a receiving opening, wherein each said chain link plate has a receiving opening which is oriented to face the receiving opening of one of the forks, and wherein each said safety latch has a safety tab which is configured to overlap a portion of the receiving opening of the respective chain link plate so as to retain a pivot pin in the receiving opening of the respective chain link plate.

5. The magazine system of claim 4, wherein the transfer mechanism means further comprises longitudinally displaceable abutments carried by the transporting levers to pivot the safety tabs out of the way so that pivot pins can be introduced into or removed from the receiving openings of the chain link plates.

6. The magazine system of claim 1, wherein the additional magazine is a single-row, static magazine having at least one rail to suspend ammunition containers.

7. The magazine system of claim 1, wherein the additional magazine is an endless, double-row, circulating magazine.

8. The magazine system of claim 7, wherein the magazines are elongated and are disposed parallel to one another in a longitudinal direction, and wherein the means for pivotably mounting the transporting levers comprises a shaft, and means for mounting the shaft so that the shaft is not movable in the longitudinal direction.

9. A tank turret magazine system, comprising:
a primary magazine disposed at a first predetermined height, the primary magazine including elongated ammunition containers having ends and having pivot pins mounted adjacent the ends, the ammunition containers additionally having longitudinal axes, and means for circulating the ammunition containers along an endless path in superposed horizontal planes, the means for circulating including transporting chains, guide means for the transporting chains, and means for releasably connecting the pivot pins of the ammunition containers to the transporting chains so that the longitudinal axes of the ammunition containers are parallel to one another;

an additional magazine which is disposed at a second predetermined height, the second predetermined height being different from the first predetermined height; and transfer mechanism means for transferring ammunition containers between the magazines, the transfer mechanism means including a pair of transporting levers having means for gripping the pivot pins of the ammunition containers, and means for pivotably mounting the transporting levers, wherein the magazines are elongated and are disposed parallel to one another in a longitudinal direction, wherein the transfer mechanisms means further comprises a yoke connecting the transporting levers, the yoke and transporting levers forming a rigid unit, and wherein the means for pivotably mounting the transporting levers comprises a shaft on which the rigid unit is pivotably mounted, and a carriage to which the shaft is connected, the carriage being displaceable in the longitudinal direction of the magazines.

10. The magazine system of claim 9, wherein the carriage has a first side and a second side, wherein the magazines include first and second magazine walls, and wherein the transfer mechanism means further comprises a supporting rail connected to the first magazine wall, the supporting rail guiding the first side of the carriage, and an elongated member connected to the second magazine wall to guide the second side of the carriage, the cross-section of the elongated member having a portion with a circular arc.

11. A tank turret magazine system, comprising:
a primary magazine disposed at a first predetermined height, the primary magazine including elongated ammunition containers having ends and having pivot pins mounted adjacent the ends, the ammunition containers additionally having longitudinal axes, and means for circulating the ammunition containers along an endless path in superposed horizontal planes, the means for circulating including transporting chains, guide means for the transporting chains, and means for releasably connecting the pivot pins of the ammunition containers to the transporting chains so that the longitudinal axes of the ammunition containers are parallel to one another;

an additional magazine which is disposed at a second predetermined height, the second predetermined height being different from the first predetermined height, the additional magazine being a single-row, static magazine having at least one rail to suspend ammunition containers; and transfer mechanism means for transferring ammunition containers between the magazines, the transfer mechanism means including a pair of transporting levers having means for gripping the pivot pins of the ammunition containers, and means for pivotably mounting the transporting levers, wherein the magazines are elongated and are disposed parallel to one another in a longitudinal direction, and wherein the means for pivotably mounting the transporting levers further comprises carriage means for moving the transporting levers in the longitudinal direction.

* * * * *